United States Patent [19]

Knappe

[11] Patent Number: 4,844,628

[45] Date of Patent: Jul. 4, 1989

[54] CAGE FOR ANTIFRICTION BEARINGS

[75] Inventor: Bernhard Knappe, Obereuerheim, Fed. Rep. of Germany

[73] Assignee: FAG Kugelfischer Georg Schafer (KGaA), Fed. Rep. of Germany

[21] Appl. No.: 209,992

[22] Filed: Jun. 22, 1988

[30] Foreign Application Priority Data

Jul. 9, 1987 [DE] Fed. Rep. of Germany ....... 3722651

[51] Int. Cl.⁴ ............................................. F16C 33/38
[52] U.S. Cl. .................................... 384/510; 384/523; 384/528
[58] Field of Search ............... 384/526, 527, 528, 534, 384/577, 510, 523

[56] References Cited

U.S. PATENT DOCUMENTS 1,366,312  1/1921  Danielsson ........................ 384/526
2,566,421  9/1951  Lapointe ............................ 384/526
3,436,135  4/1969  Bomberger ........................ 384/526

Primary Examiner—Lenard A. Footland
Attorney, Agent, or Firm—Ostrolenk, Faber, Gerb & Soffen

[57] ABSTRACT

A cage for an antifriction bearing is an elongate strip of injection molded plastic in the form of individual cage sections. Each section has lateral sides and cross webs which together define a pocket for a respective bearing rolling element. Adjacent cage sections are connected by thin strip connecting webs which are of a length to define an open space between adjacent sections. Respective connecting hooks are defined at the cross webs of each cage section. Following separation of two sections by breaking the connecting webs therebetween, the sections can be later reconnected for defining a complete circular cage by hooking the respective hooks at the cross webs of the neighboring sections to each other.

10 Claims, 1 Drawing Sheet

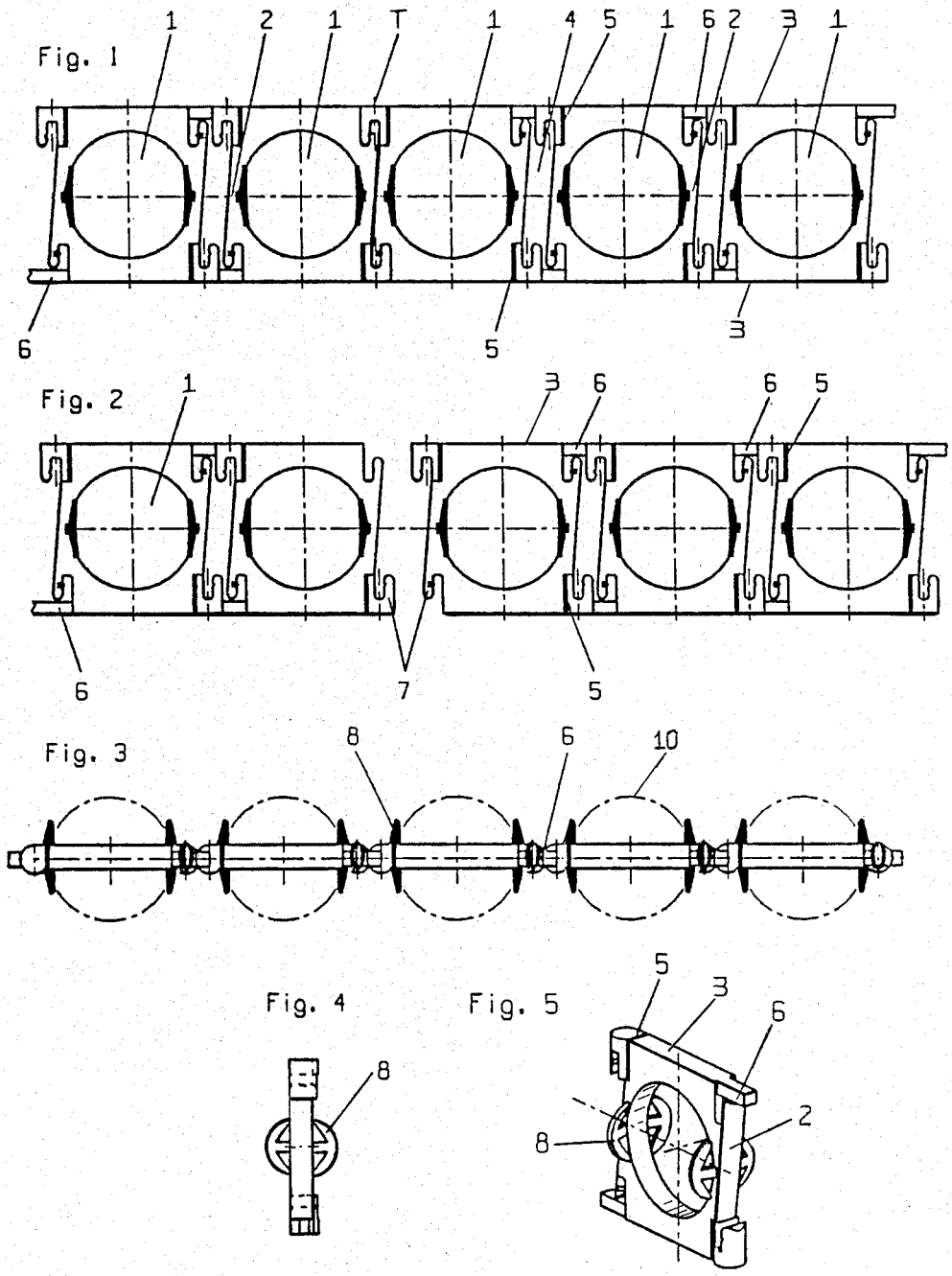

CAGE FOR ANTIFRICTION BEARINGS

BACKGROUND OF THE INVENTION

The present invention relates to a cage for the rolling elements of antifriction bearings, and particularly to the formation and assembly of the elements of the cage.

A cage for a bearing may include closed pockets for the rolling elements and lateral slots in the lateral side edges of the pockets to increase the circumferential elasticity of the cage. Such a cage is known from Federal Republic of Germany Utility Model No. 18 06 341. However, it has the disadvantage that such a cage could be used only for low speeds of revolution, because at high speeds of revolution, irregularities in the travel of the balls take place in the circumferential direction. This leads to the cage being acted on in tension. Particularly when there is a narrow slot between the outer and inner rings of the bearing, the cage may act as a strip brake or, in case of guidance of the rolling bodies, may brake the rolling bodies. This frequently leads to the tearing of the cage strip or to increases in the bearing friction, which can lead to hot running of the bearing.

Federal Republic of Germany AS No. 12 34 455 discloses an attempt to solve this problem by dividing the cage into a plurality of segments. However, this has the disadvantage that there is increased noise in operation due to the segments striking against each other. Furthermore, the ends of the segments are subject to wear.

SUMMARY OF THE INVENTION

It is therefore the object of the present invention to develop an antifriction bearing cage of the aforementioned type to avoid the above disadvantages.

A further object of the invention is to provide a cage with rolling element pockets which can be varied in number.

Another object of the invention is to provide an effective molded cage.

A further object of the invention is to provide such a cage which has necessary flexibility.

Yet another object of the invention is to provide a cage or a strip of cage pockets which can be separated or broken along its length and then reattached to form a cage.

According to the invention, the cage for an antifriction bearing includes a plurality of pockets, each for receiving a rolling elements. The cage is divided into a plurality of sections, each including one (or even perhaps more) closed pocket or window for receiving a respective rolling element. Each section of the cage is comprised of opposite lateral side pieces arranged circumferentially along the cage, and each section of the cage has cross webs which define the ends of the section and define the pockets for the rolling elements.

According to the invention, the cage is formed of individual sections of moldable plastic, and the individual sections are initially attached to each other by molded connecting webs between them. The webs may be in the form of narrow width strips or filaments extending between adjacent edges of the sections, although the webs may have other forms. The webs may also be developed as film hinges. Preferably, the entire cage and all its segments joined by webs is formed in an elongate strip of pockets by injection molding. The connecting webs are designed so that they can be easily broken for separating the strip into a length of the desired number of pockets for a particular number of rolling elements and for a particular circumference cage.

To construct the cage from a strip or reconstruct the cage after two cage sections have been separated, there are integrally formed at the ends of every section a respective connecting means for reconnecting the ends of adjacent sections. In a preferred embodiment, those connecting means are in the form of cooperating hooks on the adjacent ends of the sections.

The sides of the pockets may be provided with lateral slots which extend slightly into the side edges of the sections and give each of them flexibility. In addition, between adjacent sections which are connected by connecting webs, there are open spaces, which also give the cage flexibility. When the webs between two cage sections are broken and the cages are reconnected by the connecting means or hooks, the joinder of these connecting means close up the open spaces between just those two sections.

Finally, as the injection molded strip is rather thin in thickness and may not be able to properly guide the molding elements, additional fixtures may be installed in each pocket which are shaped to provide guidance and some support if needed to the rolling elements.

With the invention, it is possible to use the cage strip, which is comprised of cage segments which are injection molded to be connected to one another and is comprised of special recesses, for bearings of different diameter so that the strip can be cut in accordance with the circumference of the bearing and the cut strip can then be connected in simple fashion at the cut ends. It is thereby possible to stretch or push together the band within an individual section due to the elasticity, so as to achieve adaptation to any bearing diameter. Furthermore, changes in length due to heat and absorption of moisture are compensated for.

Other objects and features of the invention are explained with reference to an illustrative embodiment shown in the drawings. BRIEF DESCRIPTION OF THE DRAWINGS FIG. 1 shows a front view of an embodiment of the cage strip according to the invention, with two sections of the strip hooked at their adjacent ends.

FIG. 2 shows the cage strip without a connecting web and ready for hooking together.

FIG. 3 shows a cage strip in top view.

FIG. 4 shows a cage strip in side view.

FIG. 5 shows an individual pocket body in perspective.

DESCRIPTION OF A PREFERRED EMBODIMENT

Referring to FIG. 1, the cage strip is a single injection molded strip illustrated as being of thin, flat, uniform thickness. It includes circular openings defining pockets 1 in it which receive the rolling elements. The cage is comprised of individual sections. Each section defines a pocket 1, and each has opposite elastic webs 2 at the opposite circumferential ends of the section, which lead to the opposite lateral edges 3 of the section of the cage strip. When the strip is separated between two sections and is then reconnected, the opening 4 between those two sections is closed in the circumferential direction between the pockets 1.

On the lateral edges 3 of each section, near the two corners of each section, lateral, transversely extending slots 5 are defined. These are shorter in their circumferential length around the strip than the openings 4. As a result, elastic guidance of the rolling elements is obtained even if the circumferential lengths of the slots 5 are reduced to zero.

The individual pocket sections of the strip are connected to the neighboring sections by the sections being injection molded to each other to form section connecting webs 6. As seen in FIG. 6, each pocket section has a respective thin web connecting piece 6 at two opposite corners, and each such web 6 is integrated with the side of the hook connector 7 on the adjacent strip section. The cage strip produced in this manner is adapted to be separated between any two sections by removal of the connecting webs 6 joining the two neighboring sections. To reconnect the ends of the strip to form a circular cage, the segments are adapted to be hooked to one another at any previously formed place of separation T.

Integrally molded onto all four corners of each section are connector hooks 7. With the webs 6 integral and unbroken, adjacent connectable hooks on adjacent sections are next to each other, but are not hooked. After the web 6 at a separation T has been broken, rejoining those section ends requires hooking together both respective hook connections 7 at both edges of both sections (T in FIG. 1). This closes the opening 4 at that separation T. But the flexibility of hooks 7 enables the flexing of the completed cage. The connecting webs 6 and the hook connections 7 are both developed as film hinges which helps the completed circular cage of pocket sections have its needed flexibility.

On each pocket there are installed two pocket fixtures 8, which hold the rolling elements 10 in the pockets. These are useful due to the thinness of completed strip.

Although the present invention has been described in connection with an embodiment thereof, many other variations and modifications will now become apparent to those skilled in the art. It is preferred, therefore, that the present invention be limited not by the specific disclosure herein, but only by the appended claims.

What is claimed is:

1. A cage for an antifriction bearing, comprising:
    individual sections each for holding a respective rolling element, the individual sections being connected one after the other to define a complete cage for a circular row of rolling elements for the bearing;
    each section of the cage comprising opposite lateral sides which extend along the circumferential direction of the completed cage and also comprising cross webs extending across the section and joining the lateral sides, the lateral sides and the cross webs being placed for defining between them an open pocket for receiving a respective rolling element;
    respective connecting webs being defined at the ends of each section at the cross webs for joining the adjacent sections of the cage, thereby to define a complete cage; the connecting webs between adjacent sections being separable for separating adjacent segments;
    respective connecting means defined on the cross webs of the sections and the connecting means on one cross web of one section being connectable with the respective connecting means on the adjacent cross web of the neighboring section for reconnecting the neighboring sections at their respective cross webs after those neighboring sections have been separated by separation of their respective connecting webs
    the cage being comprised of moldable material and the entire cage being molded.

2. The cage of claim 1, wherein the connecting means comprise a respective hook defined at the cross web of each section and the hook is placed for cooperating with a respective hook at the cross web of the adjacent section for connecting the sections.

3. The cage of claim 2, wherein each section has a respective hook defined on the cross web at each lateral side of the section.

4. The cage of claim 1, wherein the connecting webs are developed as film hinges.

5. The cage of claim 1, wherein the connecting webs and the cross webs of the sections are so shaped and placed and of a length that with the connecting webs joining neighboring sections, an open space is left between the cross webs of the neighboring sections.

6. The cage of claim 5, further comprising lateral slots extending into the material of the section from the lateral sides thereof, the slots being of a circumferential length which is less than the circumferential length of the openings between neighboring sections.

7. The cage of claim 6, wherein the cross webs of each section are elastic.

8. The cage of claim 1, further comprising lateral slots extending into the material of the section from the lateral sides thereof.

9. The cage of claim 1, further comprising pocket fixtures disposed in the pockets for providing guidance to rolling elements disposed in the pockets.

10. The cage of claim 9, wherein the molded cage is relatively thin and flat in thickness and the fixtures are wider in thickness for providing guidance to the rolling elements.

* * * * *